(12) United States Patent
Barsness et al.

(10) Patent No.: US 7,962,442 B2
(45) Date of Patent: Jun. 14, 2011

(54) MANAGING EXECUTION OF A QUERY AGAINST SELECTED DATA PARTITIONS OF A PARTITIONED DATABASE

(75) Inventors: Eric L. Barsness, Pine Island, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 11/468,966

(22) Filed: Aug. 31, 2006

(65) Prior Publication Data

US 2008/0059408 A1    Mar. 6, 2008

(51) Int. Cl.
*G06F 7/00* (2006.01)

(52) U.S. Cl. ............... 707/600; 707/713; 707/E17.014; 707/E17.044

(58) Field of Classification Search .................. None
See application file for complete search history.

(56) References Cited

U.S. PATENT DOCUMENTS

| | | | | |
|---|---|---|---|---|
| 4,853,843 | A * | 8/1989 | Ecklund ................... | 707/203 |
| 5,812,840 | A * | 9/1998 | Shwartz ................... | 1/1 |
| 5,918,225 | A * | 6/1999 | White et al. ............. | 707/3 |
| 5,956,706 | A * | 9/1999 | Carey et al. ............. | 1/1 |
| 6,014,656 | A * | 1/2000 | Hallmark et al. ........ | 707/2 |
| 6,092,062 | A * | 7/2000 | Lohman et al. .......... | 707/2 |
| 6,212,524 | B1* | 4/2001 | Weissman et al. ....... | 1/1 |
| 6,289,334 | B1 | 9/2001 | Reiner et al. | |
| 6,598,038 | B1* | 7/2003 | Guay et al. .............. | 707/2 |
| 6,625,593 | B1* | 9/2003 | Leung et al. ............ | 707/2 |
| 6,738,755 | B1* | 5/2004 | Freytag et al. .......... | 707/2 |
| 6,754,653 | B2* | 6/2004 | Bonner et al. ........... | 1/1 |
| 7,299,220 | B2* | 11/2007 | Chaudhuri et al. ...... | 707/2 |
| 7,343,367 | B2* | 3/2008 | Muras et al. ............. | 1/1 |
| 7,350,172 | B1* | 3/2008 | Koh et al. ................ | 716/7 |
| 7,447,679 | B2* | 11/2008 | Shankar et al. .......... | 707/3 |
| 7,616,840 | B2* | 11/2009 | Erol et al. ................ | 382/305 |
| 7,756,861 | B2* | 7/2010 | Muras et al. ............. | 707/718 |
| 2002/0116589 | A1* | 8/2002 | Gold ........................ | 711/163 |

(Continued)

FOREIGN PATENT DOCUMENTS

DE    EP 1 544 753    * 11/2004

OTHER PUBLICATIONS

Bowman et al., Optimization of Query Streams Using Semantic Prefetching, Dec. 2005, ACM, vol. 30, Issue 4, pp. 1056-1101.*

(Continued)

*Primary Examiner* — Apu M Mofiz
*Assistant Examiner* — Jessica N Le
(74) *Attorney, Agent, or Firm* — Patterson & Sheridan, LLP

(57) ABSTRACT

The present invention generally relates to data processing, and more specifically to executing queries against a partitioned database. One embodiment provides a computer-implemented method of managing execution of a query against a partitioned database having a plurality of data partitions. The method comprises receiving a query having conditional filtering logic to restrict the data records in the partitioned database to a result set satisfying the conditional filtering logic. On the basis of an indication that only a subset of the result set is to be returned, a subset of data partitions is determined from the plurality of data partitions from which the subset of the result set can be retrieved. Then, the query is executed only against the subset of data partitions.

18 Claims, 7 Drawing Sheets

U.S. PATENT DOCUMENTS

| | | | |
|---|---|---|---|
| 2002/0143751 A1* | 10/2002 | Chow et al. | 707/3 |
| 2004/0133538 A1* | 7/2004 | Amiri et al. | 707/1 |
| 2004/0215638 A1* | 10/2004 | Kapoor et al. | 707/100 |
| 2005/0021505 A1* | 1/2005 | Bernal et al. | 707/3 |
| 2005/0049987 A1* | 3/2005 | Meek et al. | 706/46 |
| 2005/0076043 A1* | 4/2005 | Benedetti et al. | 707/100 |
| 2005/0081210 A1* | 4/2005 | Day et al. | 718/104 |
| 2005/0192921 A1* | 9/2005 | Chaudhuri et al. | 707/1 |
| 2005/0235054 A1* | 10/2005 | Kadashevich | 709/223 |
| 2006/0089946 A1* | 4/2006 | Schumacher | 707/102 |
| 2006/0248056 A1* | 11/2006 | Fang et al. | 707/3 |
| 2006/0259457 A1* | 11/2006 | Muras et al. | 707/2 |

OTHER PUBLICATIONS

Zuzarte et al., WinMagic: Subquery Elimination Using Window Aggregation, Jun. 2003, ACM, pp. 652-656.*

* cited by examiner

| PARTITION ID | INCLUDE/EX-CLUDE FLAG | INCLUDE/EXCLUDE CONDITIONS | HISTORICAL EXE-CUTION SPEED | CURRENT BUSY FLAG | OPTIMIZER AWARENESS FLAG |
|---|---|---|---|---|---|
| 1 | INCLUDE | USER ID = 5001 | NO | NO | NO |
| 2 | EXCLUDE | CPU < 25% | YES | YES | YES |
| 3 | INCLUDE | DASD < 10% | YES | NO | YES |
| 4 | EXCLUDE | MEMORY > 5% | NO | YES | YES |

FIG. 5

MANAGING EXECUTION OF A QUERY AGAINST SELECTED DATA PARTITIONS OF A PARTITIONED DATABASE

BACKGROUND OF THE INVENTION

1. Field of the Invention

The present invention generally relates to data processing and, more particularly, to executing queries against a partitioned database.

2. Description of the Related Art

Databases are computerized information storage and retrieval systems. A relational database management system (RDBMS) is a database management system (DBMS) that uses techniques for storing and retrieving data. The most prevalent type of database is the relational database, a tabular database in which data is defined so that it can be reorganized and accessed in a number of different ways.

Databases are typically partitioned to improve availability, performance, and scalability. Partitioning a database involves dividing the database or its constituent elements into distinct individual parts. For example, a database may be partitioned by building smaller separate databases, each with its own tables, indexes, transaction logs, etc. or by splitting a selected element, for example a field of a table. The database may be partitioned within a single server, or distributed or replicated across multiple servers. Therefore, database partitioning provides multiple benefits including scalability to support large databases, the ability to handle complex workloads, and increased parallelism.

When queries are run against a partitioned database, the query may be run against each partition. The results from each partition may then be integrated to provide a complete query result for the query. To further improve performance of querying a database, the query may not be run against one or more partitions which are known to not contain results for the query. For example, an underlying database may be partitioned based on location. The locations, for example, may be divided into four partitions, each partition being associated with data from one of the eastern states, western states, northern states, and southern states.

If a query containing a condition STATE='ALABAMA' is run against the underlying database, the query need not be run against partitions containing data for northern and western states. Therefore, by eliminating the number of partitions against which a query is executed, the performance may be improved. However, even with elimination of partitions, the query may still be run against multiple partitions. For example, the above query may be executed against the southern states partition and the eastern states partition.

Furthermore, in the given example a complete query result may be obtained for particular queries from a single partition. For example, assume that a given query is run against the partitions containing data for the southern and eastern states in order to identify different age groups of individuals driving a particular automobile. Assume further that only five data records that are ordered in ascending order by location should be returned in a corresponding query result. Assume now that data related to ten distinct age groups is included with the underlying database and that the southern states partition is slower than the eastern states partition. In other words, determination of a result set from the southern states partition takes significantly longer than determination of a result set from the eastern states partition.

By way of example, assume now that a result set can quickly be returned from the eastern states partition having five data records related to distinct age groups in the state Alabama. Accordingly, the result set represents a complete query result so that data returned from the southern states partition would not be required to complete this query result. Thus, execution of the query against the underlying database is inefficient because the complete result set for the above query is not returned to the user until the results from the slower partition, i.e., the southern states partition, are available. Furthermore, a significant amount of time may be wasted while waiting for the slower partition to retrieve results. Therefore overall query throughput may be adversely affected.

Therefore, there is a need for an efficient technique for managing execution of queries against partitioned databases.

SUMMARY OF THE INVENTION

The present invention generally relates to data processing, and more specifically to executing queries against a partitioned database.

One embodiment provides a computer-implemented method of managing execution of a query against a partitioned database having a plurality of data partitions. The method comprises receiving a query having conditional filtering logic to restrict the data records in the partitioned database to a result set satisfying the conditional filtering logic. On the basis of an indication that only a subset of the result set is to be returned, a subset of data partitions is determined from the plurality of data partitions from which the subset of the result set can be retrieved. Then, the query is executed only against the subset of data partitions.

Another embodiment provides a computer-readable medium containing a program which, when executed by a processor, performs a process for managing execution of a query against a partitioned database having a plurality of data partitions. The process comprises receiving a query having conditional filtering logic to restrict the data records in the partitioned database to a result set satisfying the conditional filtering logic. On the basis of an indication that only a subset of the result set is to be returned, a subset of data partitions is determined from the plurality of data partitions from which the subset of the result set can be retrieved. The query is only executed against the subset of data partitions.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 is an illustrative table exemplifying predefined execution parameters according to one embodiment of the invention.

DETAILED DESCRIPTION OF THE PREFERRED EMBODIMENTS

Introduction

Figure 1:
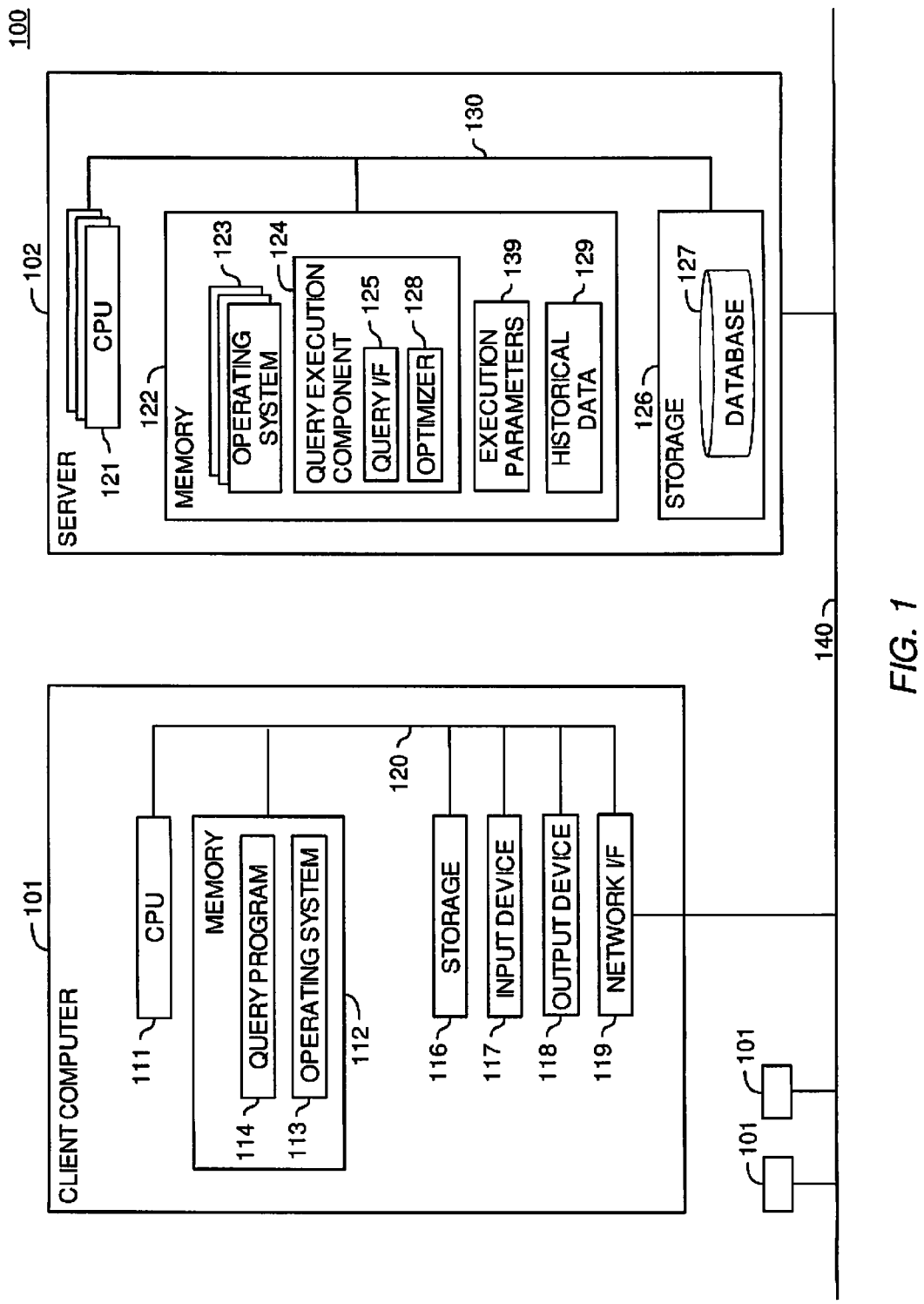
FIG. 1 is an illustration of an exemplary computer system according to one embodiment of the invention.

The present invention generally relates to data processing and, more particularly, to executing a query against a partitioned database having a plurality of data partitions. In general, a query that is issued against a partitioned database is executed against each of a plurality of data partitions defining the partitioned database to determine a result set from each data partition. The determined result sets from the plurality of data partitions may be integrated to provide a query result for the query.

In one embodiment, a query against an underlying partitioned database is associated with an indication that only a subset of a corresponding query result for the query is to be returned from the database. For instance, the indication is a clause of the query limiting results to be returned to the subset of the corresponding query result, such as a "FETCH FOR X ROWS" clause in an SQL query, where X defines a requested amount of data records. Alternatively, the indication can be historical data indicative of the requested amount of data records returned from specified data partitions of the underlying partitioned database for previous executions of the query.

In one embodiment, a subset of data partitions is determined from a plurality of data partitions defining the underlying partitioned database. The determined subset of data partitions is suitable (as determined on the basis of available information) to provide the subset of the corresponding query result of a query. Thus, the query may be executed only against the determined subset of data partitions to retrieve the subset of the corresponding query result, thereby avoiding unnecessarily utilizing partition resources.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the network environment 100 shown in FIG. 1 and described below. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) having information permanently stored thereon; and (ii) writable storage media (e.g., floppy disks within a diskette drive or hard-disk drive) having alterable information stored thereon. In other embodiments, information may be conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Computer System

FIG. 1 depicts a block diagram of a networked system 100 in which embodiments of the present invention may be implemented. In general, the networked system 100 includes a client (e.g., user's) computer 101 (three such client computers 101 are shown) and at least one server 102 (one such server 102 shown). The client computers 101 and server 102 are connected via a network 140. In general, the network 140 may be a local area network (LAN) and/or a wide area network (WAN). In a particular embodiment, the network 140 is the Internet.

The client computer 101 includes a Central Processing Unit (CPU) 111 connected via a bus 120 to a memory 112, storage 116, an input device 117, an output device 118, and a network interface device 119. The input device 117 can be any device configured to give input to the client computer 101. For example, a keyboard, keypad, light-pen, touch-screen, track-ball, or speech recognition unit, audio/video player, and the like could be used. The output device 118 can be any device configured to give output to the user, e.g., any conventional display screen. Although shown separately from the input device 117, the output device 118 and the input device 117 could be combined. For example, a display screen with an integrated touch-screen, a display with an integrated keyboard, or a speech recognition unit combined with a text speech converter could be used.

The network interface device 119 may be any entry/exit device configured to allow network communications between the client computers 101 and server 102 via the network 140. For example, the network interface device 119 may be a network adapter or other network interface card (NIC).

Storage 116 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 116 could be part of one virtual address space spanning multiple primary and secondary storage devices.

The memory 112 is preferably a random access memory sufficiently large to hold the necessary programming and data structures of the invention. While memory 112 is shown as a single entity, it should be understood that memory 112 may in fact comprise a plurality of modules, and that memory 112 may exist at multiple levels, from high speed registers and caches to lower speed but larger DRAM chips.

Illustratively, the memory 112 contains an operating system 113. Illustrative operating systems, which may be used to advantage, include Linux (Linux is a trademark of Linus Torvalds in the US, other countries, or both) and Microsoft's Windows®. More generally, any operating system supporting the functions disclosed herein may be used.

Memory 112 is also shown containing a query program 114 which, when executed by CPU 111, provides support for querying a server 102. In one embodiment, the query program 114 includes a web-based Graphical User Interface (GUI), which allows the user to display Hyper Text Markup Language (HTML) information. More generally, however, the query program 114 may be a GUI-based program capable of rendering the information transferred between the client computer 101 and the server 102.

The server 102 may by physically arranged in a manner similar to the client computer 101. Accordingly, the server 102 is shown generally comprising one or more CPUs 121, a memory 122, and a storage device 126, coupled to one another by a bus 130. Memory 122 may be a random access memory sufficiently large to hold the necessary programming and data structures that are located on the server 102.

In one embodiment of the invention, server 102 may be a logically partitioned system, wherein each partition of the system is assigned one or more resources available in server 102. Accordingly, server 102 may generally be under the control of one or more operating systems 123 shown residing in memory 122. Each logical partition of server 102 may be under the control of one of the operating systems 123. Examples of the operating system 123 include IBM OS/400®, UNIX, Microsoft Windows®, and the like. More generally, any operating system capable of supporting the functions described herein may be used.

While a logically partitioned system is described herein, one skilled in the art will recognize that embodiments of the invention are not limited to such logically partitioned systems. Embodiments of the invention may also be implemented in physically partitioned systems, non-partitioned systems, or any other reasonable system configuration.

The memory 122 may include a query execution component 124. The query execution component 124 may be a software product comprising a plurality of instructions that can be resident at various times in various memory and storage devices in the computer system 100. For example, the query execution component 124 may contain a query interface 125. The query interface 125 (and more generally, any requesting entity, including the operating system 123) is configured to issue queries against a database 127 (shown in storage 126).

Query execution component 124 may also include an optimizer 128. Optimizer 128 may determine the most efficient way to execute a query. For example, optimizer 128 may consider a plurality of access plans for a given query and determine which of those plans will be the most efficient. Determining efficiency of an access plan may include determining an estimated cost for executing the query. The cost may be determined, for example, by available memory, number of Input/Output (IO) operations required to execute the query, CPU requirements, and the like.

Database 127 is representative of any collection of data regardless of the particular physical representation. By way of illustration, the database 127 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment of the invention, the database 127 is a partitioned database. Accordingly, database 127 may be divided or broken into its constituent elements to create distinct individual parts referred to as "data partitions". A data partition consists of its own data, indexes, configuration files, and transaction logs. A data partition is sometimes called a node or a database node. For example, database 127 may be partitioned by building smaller separate databases, each with its own tables, indexes, transaction logs, etc., or by splitting a selected element, for example a field of a table. Tables can be located in one or more data partitions. When a table's data is distributed across multiple partitions, some of its rows are stored in one partition, and other rows are stored in other partitions.

In one embodiment, the partitioned database 127 contains one or more data partitions of a larger database. Thus, in one embodiment, the individual partitions may be distributed over a plurality of servers (such as server 102). A query received from a client 102 may be executed against one or more of the data partitions of the larger database contained in the one or more servers 102. Data retrieval and update requests are decomposed automatically into sub-requests, and executed in parallel among the applicable data partitions. The fact that databases are split across data partitions may be transparent to users.

Typically, a single data partition exists on each physical component that makes up a computer. The processors on each system are used by the database manager at each data partition to manage its part of the total data in the database. Because data is divided across data partitions, the power of multiple processors on multiple computers may be used to satisfy requests for information. Data retrieval and update requests are decomposed automatically into sub-requests and are executed in parallel among the applicable data partitions.

User interaction occurs through one data partition, known as the coordinator partition for that user. The coordinator runs on the same data partition as the application, or, in the case of a remote application, the data partition to which that application is connected. Any data partition can be used as a coordinator partition.

Figure 6:
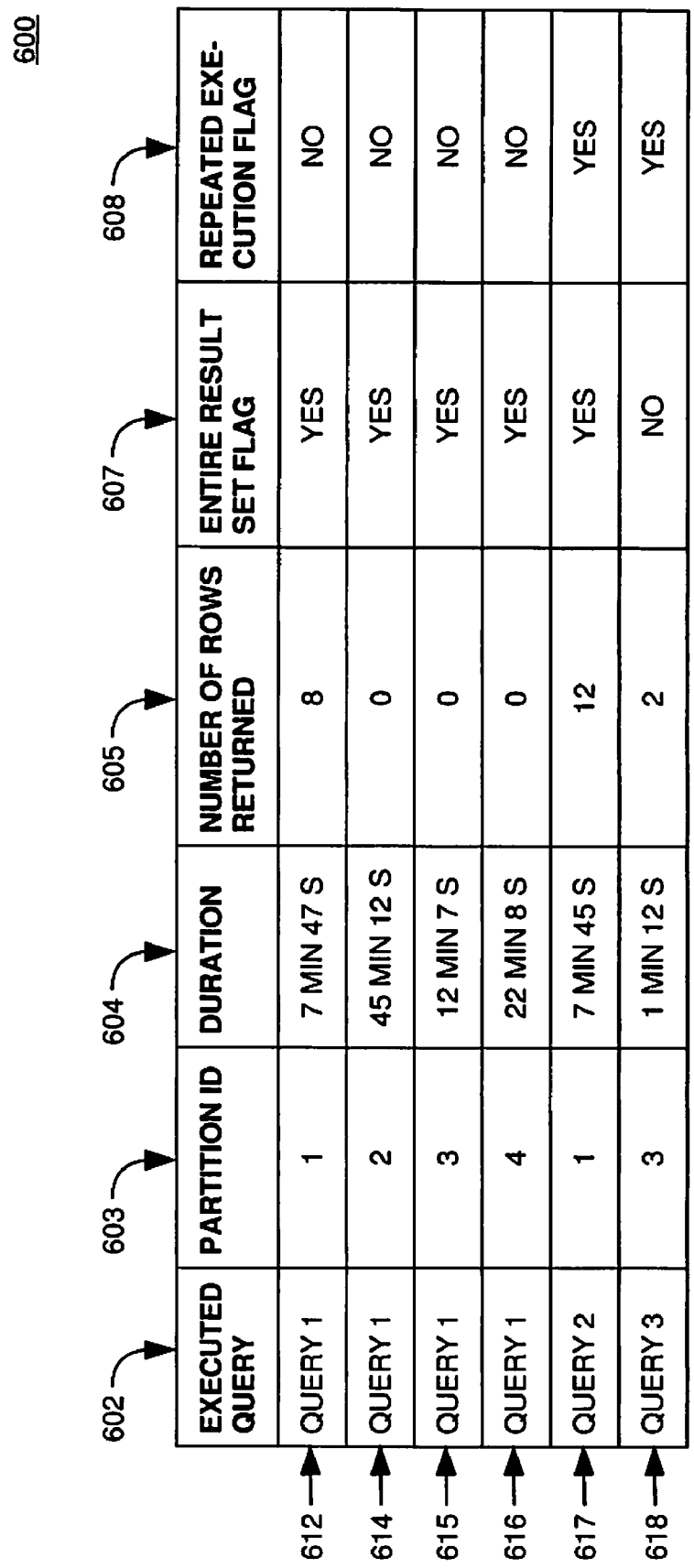
FIG. 6 is an illustrative table exemplifying historical data according to one embodiment of the invention.

Memory 122 illustratively also includes historical data 129. In one embodiment, historical data 129 includes information related to previous executions of queries against the partitioned database 127. The historical data 129, for example, may include the query execution duration for a previous execution of a given query against one or more partitions of the partitioned database 127. An illustrative table exemplifying the historical data 129 is illustrated in FIG. 6.

Memory 122 illustratively further includes predefined execution parameters 139. In one embodiment, execution parameters 139 define user preferences for execution of a given query against the partitioned database 127. The execution parameters 139, for example, may define conditions that need to be satisfied to enable/disable execution of the given query against a selected data partition of the partitioned database 127. An illustrative table exemplifying the execution parameters 139 is illustrated in FIG. 5.

An Exemplary Partitioned Database Environment

Figure 2:
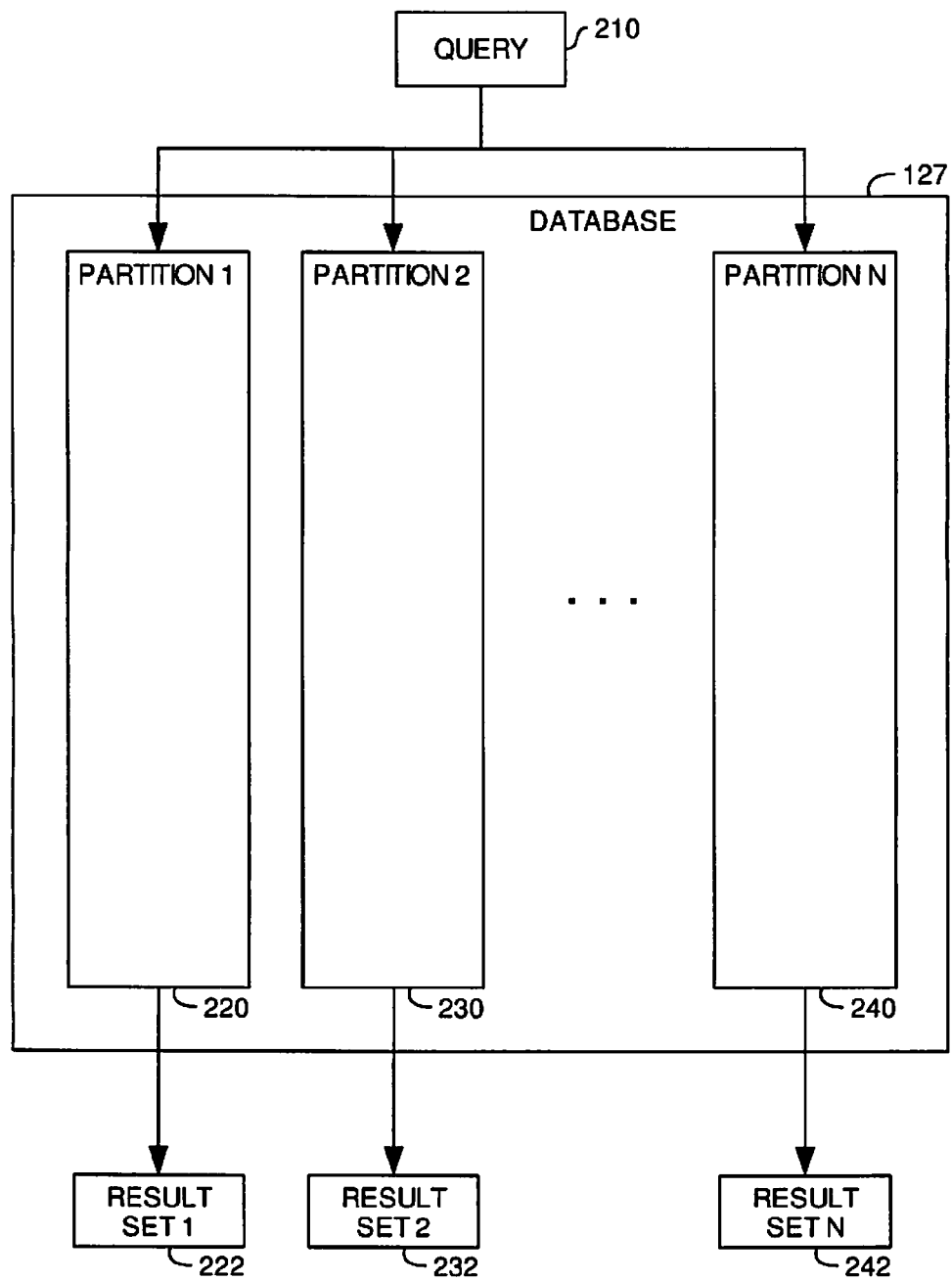
FIG. 2 is an illustration of a partitioned database, according to one embodiment of the invention.

FIG. 2 illustrates an exemplary implementation of the database 127 of FIG. 1 as a partitioned database according to one embodiment of the invention. Accordingly, the database 127 illustratively includes a plurality of data partitions 220 "PARTITION 1", 230 "PARTITION 2" and 240 "PARTITION N" (three partitions are illustrated, for simplicity).

In one embodiment, a query 210 received from a requesting entity such as a user is executed against the partitioned database 127. Query 210 may include a set of commands or clauses for retrieving data stored in the partitioned database 127. The query 210 may come from a client computer (e.g., client computer 102 of FIG. 1), an operating system (e.g., operating system 113 of FIG. 1), or a remote system. Furthermore, the query 210 may specify columns of tables included with the partitioned database 127 from which data is to be retrieved, join criteria for joining columns from multiple tables, and conditional filtering logic to restrict data records in the partitioned database 127 to a query result returned for the query 210 that satisfies the conditional filtering logic. Moreover, the query 210 may invoke one or more user-defined functions (UDFs) to perform user or application-specific operations on data records included with the partitioned database 127.

Executing the query 210 against the partitioned database 127 involves running the query 210 against one or more of the plurality of data partitions 220, 230, 240. Illustratively, the query 210 is executed against each of the data partitions 220, 230, 240. One skilled in the art will recognize that when query 210 is executed against each data partition, each of the partitions 220, 230, 240 may take a different amount of time to return a corresponding result set 222, 232, 242 for the query 210. Factors affecting the time taken to retrieve results for a result set of a given partition may include the size of the partition, availability of a CPU to execute the query, clock speed, and the like. Each of the corresponding result sets 222, 232, 242 can be empty or include one or more data records. The returned result sets 222, 232, 242 can be combined to provide a complete query result for the query 210.

An illustrative query exemplifying the query 210 is shown in Table I below. By way of illustration, the illustrative query is defined using SQL. However, any other language may be used to advantage and is, thus, broadly contemplated.

TABLE I

SQL QUERY EXAMPLE

| | |
|---|---|
| 001 | SELECT DISTINCT |
| 002 | grade |
| 003 | FROM |
| 004 | student_grades |
| 005 | WHERE |
| 006 | algebra_skills = 'N' |
| 007 | ORDER BY |
| 008 | state   ASC |
| 009 | FETCH FOR |
| 010 | 8   ROWS |

The exemplary SQL query of Table I is configured to retrieve information related to possible grades ("grade" in line 002) of students which do not have algebra skills ("algebra_skills='N'" in line 006), meaning, for example, that the students have not taken any algebra courses. This information should be retrieved from a "student_grades" table (line 003-004 of Table I) of the underlying database(s). However, a corresponding query result for the exemplary SQL query of Table I should only include distinct grades ("SELECT DISTINCT" in line 001 of Table I), i.e., each grade should be listed only once. Furthermore, the returned distinct grades should be ordered in ascending order ("ASC" in line 008 of Table I) with respect to a state where the students are living ("ORDER BY state ASC" in lines 007-008 of Table I). Moreover, only eight data records ("FETCH FOR 8 ROWS" in lines 009-010 of Table I) should be returned in the corresponding query result.

Assume now that the partitioned database 127 is divided into four distinct partitions, each having a separate "student_grades" table. Assume further that the database 127 is partitioned based on location of states, such that each data partition is associated with data from one of the eastern states, western states, northern states, and southern states. Exemplary "student_grades" tables in the eastern, northern, western and southern states partitions that exemplify the data partitions 220, 230, 240 are illustrated in Tables II to V below. It should be noted that the tables referred to herein are merely for purposes of illustration and not intended to be limiting. In practice, partitioned databases used for commercial, scientific, medical, financial, etc. purposes would typically have hundreds or thousands (or more) of columns and in excess of millions of rows.

TABLE II

EASTERN STUDENT GRADES TABLE EXAMPLE

| | student_ID | algebra_skills | grade | state |
|---|---|---|---|---|
| 001 | 1 | N | 5 | Alabama |
| 002 | 2 | Y | 14 | Florida |
| 003 | 3 | N | 7 | Alabama |
| 004 | 4 | N | 8 | Alabama |
| 005 | 5 | N | 9 | Alabama |
| 006 | 6 | Y | 15 | North Carolina |
| 007 | 7 | N | 12 | Alabama |
| 008 | 8 | N | 6 | Alabama |
| 009 | 9 | N | 10 | Alabama |
| 010 | 10 | N | 11 | Alabama |
| 011 | 11 | Y | 16 | Maine |
| 012 | 12 | Y | 13 | Pennsylvania |
| 013 | | | | |

TABLE III

NORTHERN STUDENT GRADES TABLE EXAMPLE

| | student_ID | algebra_skills | grade | state |
|---|---|---|---|---|
| 001 | 101 | Y | 14 | Montana |
| 002 | 102 | N | 5 | Montana |
| 003 | 103 | N | 7 | North Dakota |
| 004 | 104 | N | 8 | Minnesota |
| 005 | 105 | Y | 15 | Minnesota |
| 006 | 106 | N | 6 | North Dakota |
| 007 | 107 | N | 9 | Ohio |
| 008 | 108 | N | 12 | Ohio |
| 009 | 109 | Y | 13 | Montana |
| 010 | | | | |

TABLE IV

WESTERN STUDENT GRADES TABLE EXAMPLE

| | student_ID | algebra_skills | grade | state |
|---|---|---|---|---|
| 001 | 201 | N | 5 | California |
| 002 | 202 | N | 5 | Oregon |
| 003 | 203 | Y | 15 | Washington |
| 004 | 204 | N | 8 | Washington |
| 005 | 205 | N | 6 | Oregon |
| 006 | 206 | Y | 16 | Oregon |
| 007 | 207 | N | 9 | California |
| 008 | 208 | N | 8 | California |
| 009 | 209 | Y | 14 | Washington |
| 010 | | | | |

TABLE V

SOUTHERN STUDENT GRADES TABLE EXAMPLE

| | student_ID | algebra_skills | grade | state |
|---|---|---|---|---|
| 001 | 301 | N | 5 | Texas |
| 002 | 302 | N | 5 | Texas |
| 003 | 303 | N | 5 | Louisiana |
| 004 | 304 | N | 5 | New Mexico |
| 005 | 305 | N | 5 | Louisiana |
| 006 | 306 | N | 5 | Arizona |
| 007 | | | | |

Each of the exemplary "student_grades" tables of Tables II to V includes four columns: "student_ID", "algebra_skills", "grade" and "state" (line 001) and a plurality of rows. By way of example, the "student_ID" column is used as a primary key that uniquely associates each of the rows in a given "student_grades" table (e.g., lines 002-013 in Table I) with a particular student. The "algebra_skills" column includes "Y" (i.e., "Yes") values for students having algebra skills, and "N" (i.e., "No") values for students which do not have algebra skills. The "grade" column contains the corresponding grades of the students. By way of example, assume that the grades may be integer values in a range from 5 to 16. The "state" column illustratively contains information indicating states where the students are living.

In one embodiment, only a subset of the complete query result for the query 210 is returned to the user who issued the query 210. For instance, the query 210 can include an explicit request to limit an amount of data records in the returned query result to a predefined amount. By way of example, the query 210 can be an SQL query having a "FETCH FOR X ROWS" clause, where "X" is the predefined amount. In the given example, the exemplary SQL query of Table I is configured to return only eight data records (lines 009-010 of Table I) in a corresponding query result using a "FETCH FOR 8 ROWS" clause.

In one embodiment, a subset of the data partitions 220, 230, 240 of the partitioned database 127 is determined from which the requested subset of the complete query result can be retrieved. By way of example, assume that suitable historical data (e.g., historical data 129 of FIG. 1) indicates that in a previous execution(s) of the exemplary SQL query of Table I against the exemplary "student_grades" tables of Tables II-V eight or more data records retrieved from Table II were returned to the user. Accordingly, by executing the exemplary SQL query of Table I only against the exemplary "student_grades" table of Table II, the requested subset of the complete query result can be retrieved.

However, it should be noted that the complete query result can be restricted to the requested subset by any suitable technique. For instance, assume that the exemplary SQL query of Table I does not include the "FETCH FOR 8 ROWS" clause according to lines 009-010 of Table I. Assume further that the user fetched only a particular number, N, of data records from the complete query result in a previous execution(s) of the query. By way of example, this can be indicated by the suitable historical data. Accordingly, on the basis of the historical data only the N data records are retrieved from the partitioned database 127 for the user, even though the user does not explicitly request N records in the present execution of the query. To this end, in one embodiment a subset of the data partitions 220, 230, 240 is determined to be suitable to retrieve the particular number of data records. In one embodiment, this determination is performed using suitable execution parameters (e.g., execution parameters 139 of FIG. 1). An exemplary method for identifying a subset of data partitions on the basis of suitable execution parameters is described below with reference to FIG. 4. Accordingly, all such different implementations are broadly contemplated.

Execution of a Query Against a Partitioned Database

Figure 3A:
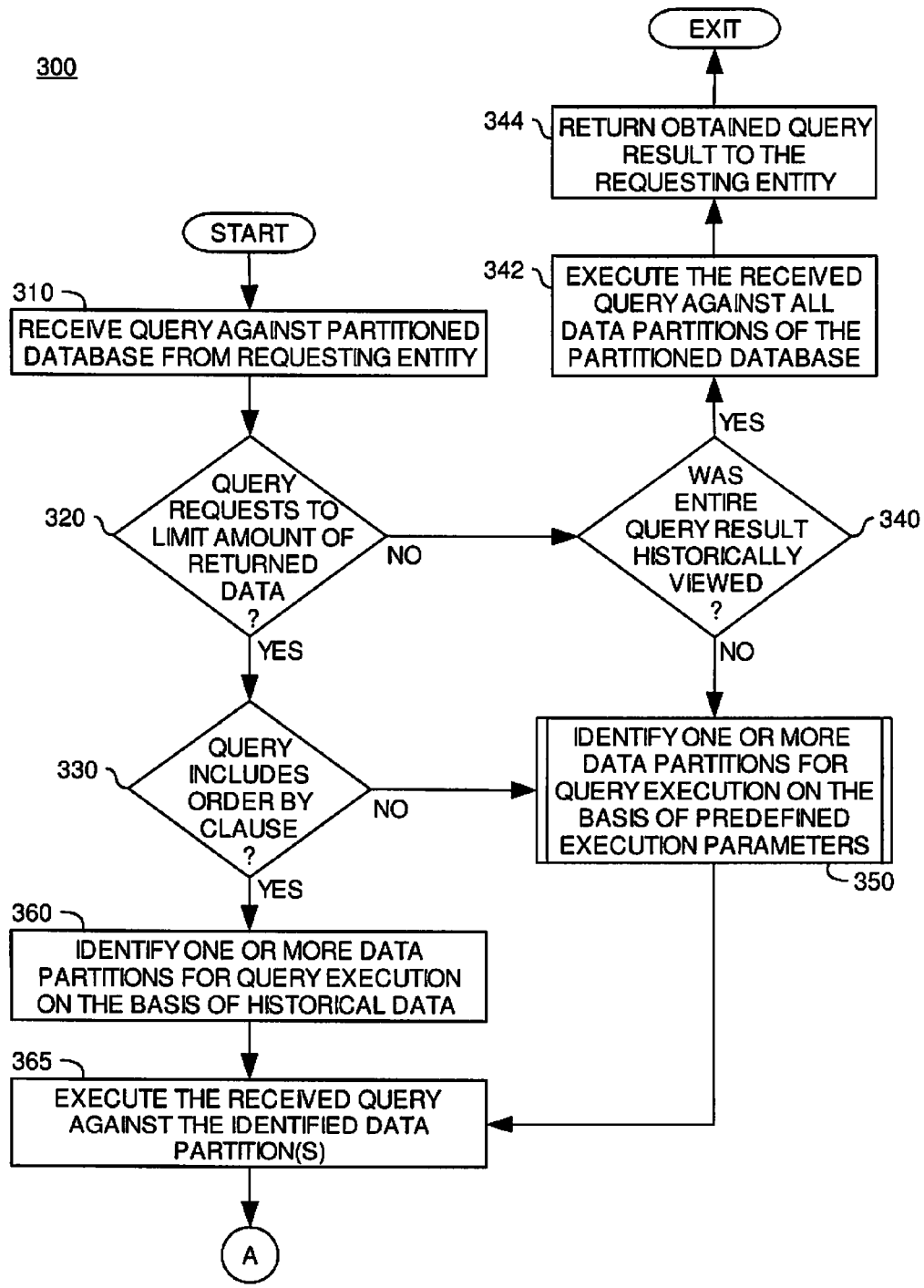
FIGS. 3A-B are flow charts illustrating a method of managing execution of a query against a partitioned database according to one embodiment of the invention.
Figure 3B:
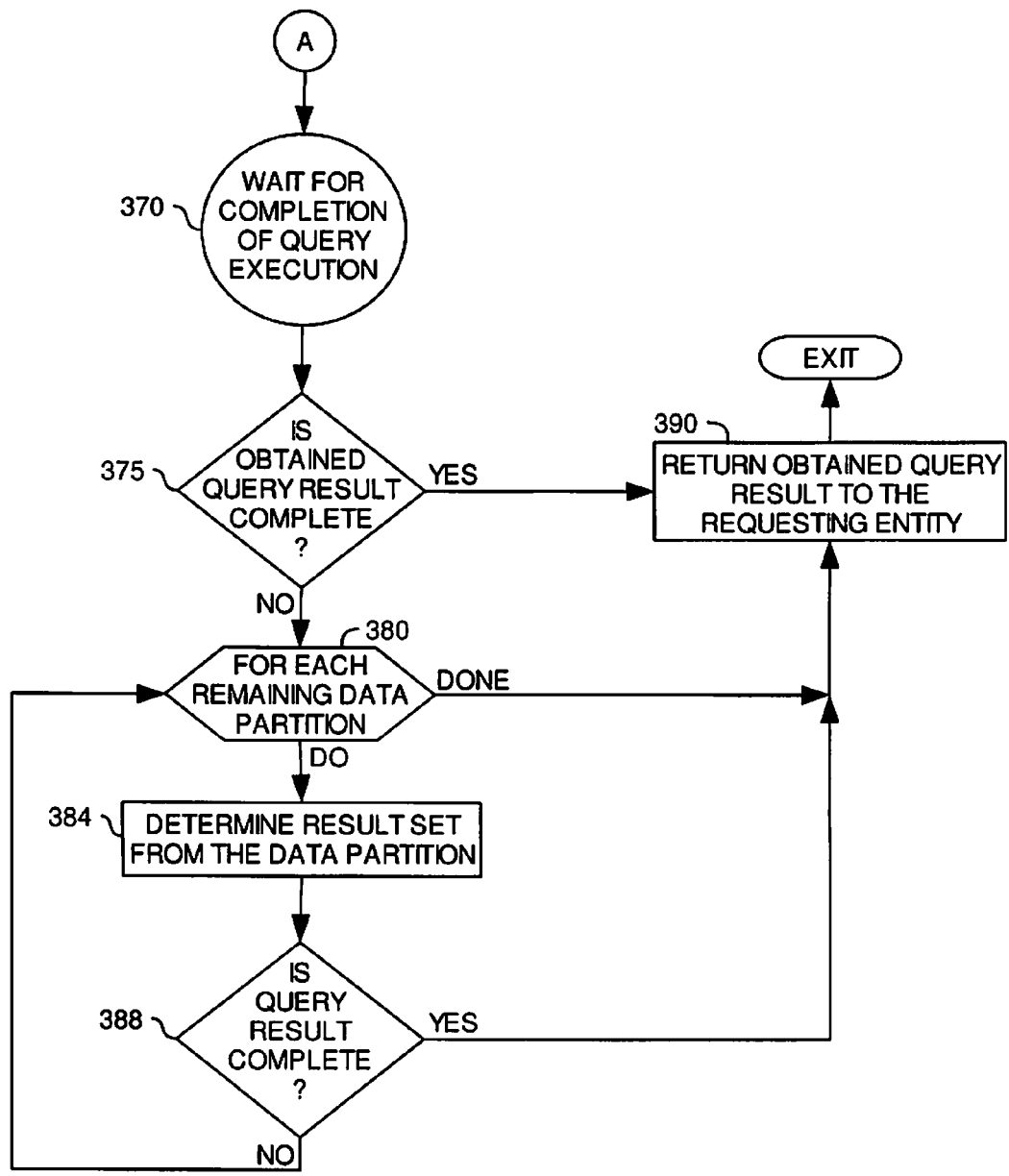

Referring now to FIGS. 3A-B, one embodiment of a method 300 for managing execution of a query (e.g., query 210 of FIG. 2) against a partitioned database (e.g., partitioned database 127 of FIG. 2) is described. At least a portion of the steps of method 300 can be performed using the query execution component 124 of FIG. 1.

Method 300 starts at step 310, where a query against a partitioned database is received from a requesting entity, such as a user. Generally, the query includes filtering logic for selecting and returning some subset of the available data in a database. For example, the received query includes a results specification consisting of one or more result fields specifying what data elements should be returned from the partitioned database in a corresponding query result. The received query may further include conditional filtering logic (e.g., a WHERE clause) specifying one or more query conditions used to evaluate whether a given element of data should be included in the corresponding query result.

At step 320, it is determined whether the received query includes a limitation request requesting that only a specified number of records be returned to the requesting entity. For instance, if the received query is an SQL query, it is determined whether the query includes a "FETCH FOR X ROWS" clause, where X designates a predefined number of data records that is to be returned with the requested subset. However, as noted above other implementations, known or unknown, that are suitable to identify the predefined amount are broadly contemplated.

If the received query includes a limitation request, processing proceeds with step 330. As was noted above, in the given example the exemplary SQL query of Table I includes the limitation request "FETCH FOR 8 ROWS" in lines 009-010. Accordingly, processing of the exemplary SQL query of Table I proceeds with step 330.

If, however, the received query does not include a limitation request, processing proceeds with step 340, where it is determined whether the corresponding query result was historically viewed in its entirety. In other words, it is determined whether the user historically fetched all data records satisfying the corresponding query result for a previous execution(s) of the received query, or only a portion thereof. To this end, suitable historical data (e.g., historical data 129 of FIG. 1) is accessed. In one embodiment, the suitable historical data includes an entire_result_set flag that is set for each previous execution of the received query, where the corresponding query result was viewed in its entirety. An illustrative table 600 exemplifying the suitable historical data 129 is now briefly described with reference to FIG. 6.

Table 600 includes one row for each data partition of an underlying partitioned database (e.g., partitioned database 127 of FIG. 2) against which a corresponding query (e.g., query 210 of FIG. 2) is executed. Each query is identified in a column 602 and each data partition is uniquely identified by a partition identifier in a column 603 of table 600. In one embodiment, the complete text of the query is included with column 602.

Illustratively, the table 600 includes six rows 612 to 618 related to three distinct queries "QUERY 1", "QUERY 2" and "QUERY 3". By way of example, assume that "QUERY 1" corresponds to the exemplary SQL query of Table I above.

The table 600 further includes columns 604, 605, 607 and 608 defining different historical parameters with respect to the distinct queries and partitions. Illustratively, column 604 contains query execution durations which are indicative of a historical execution speed of the queries on the different partitions. In one embodiment, the durations in column 604 are accessed in step 440 of method 400 of FIG. 4 as described above. Column 605 contains amounts of data records returned from data partitions in previous executions of the corresponding queries. In one embodiment, the amounts in column 605 are accessed in step 360 of FIG. 3A as described above. Column 607 contains entire result set flags that are accessed, in one embodiment, at step 340 of FIG. 3A, as described above.

The table 600 illustratively further includes column 608 that contains repeated execution flags that are set for queries that were repeatedly executed against corresponding data partitions. However, it should be noted that the column 608 is merely shown to illustrate that the table 600 may include various different historical parameters that are not necessarily required for execution of queries according to embodiments of the invention. All such implementations are broadly contemplated.

Returning again to FIG. 3, if it is determined at step 340 that the corresponding query result was historically viewed in its entirety, i.e., the entire_result_set flag for a previous execution(s) of the received query is set, processing proceeds with step 342. Otherwise, processing proceeds with step 350.

At step 342, the received query is executed against all data partitions (e.g., data partitions 220, 230, 240 of FIG. 2) of the partitioned database to determine the corresponding query result. Executing the received query against all data partitions of the partitioned database to determine the corresponding query result is well-known in the art and, therefore, not explained in more detail. The corresponding query result is then returned to the user at step 344 and processing exits. For instance, the corresponding query result is displayed to the user and query processing according to the method 300 exits.

At step 350, it is assumed that execution of the received query against one or more selected data partitions of the partitioned database may return enough data records for the user, as the corresponding query result was historically not entirely viewed. For instance, in one embodiment the historical data can indicate a number of data records that the user fetched in a previous execution(s) of the received query. In this case, the selected data partition(s) is identified on the basis of predefined execution parameters (e.g., execution parameters 139 of FIG. 1). Processing then proceeds with step 365. An exemplary method for identifying selected data partition(s) on the basis of predefined execution parameters in described below with reference to FIG. 4. An illustrative table exemplifying the execution parameters 139 is described below with reference to FIG. 5.

At step 330, it is determined whether the received query includes an "ORDER BY" clause. Furthermore, in one embodiment it is determined whether the "ORDER BY" clause is configured to order the requested subset of data records on the basis of an underlying subject matter relationship of data according to which the partitioned database is partitioned. If so, processing proceeds with step 360. Otherwise, processing proceeds with step 350.

As was noted above, the exemplary SQL query of Table I includes an "ORDER BY" clause in lines 007-008 ("ORDER BY state ASC"). The exemplary partitioned database having the exemplary "student_grades" tables in Tables II-V is partitioned on the basis of the location of states, i.e., according to whether they are eastern, western, northern or southern states. Thus, the "ORDER BY" clause in lines 007-008 of Table I that refers to an ordering according to retrieved "state" information has a subject matter relationship to the manner in which the data in Tables II-V is organized. Accordingly, in the given example processing proceeds with step 360.

At step 360, a subset of data partitions from the data partitions of the partitioned database is identified on the basis of the suitable historical data. The subset of data partitions is determined to be suitable for retrieval of data records defining the requested subset of data records.

For instance, assume that in the given example the suitable historical data indicates that for a previous execution(s) of the exemplary SQL query of Table I eight data records were returned from the eastern states partition having the exemplary "student_grades" table of Table II. As eight records need to be returned in the requested subset of data records according to lines 009-010 of the exemplary SQL query of Table I, the eastern states partition is identified as the partition from which the records can be retrieved on the basis of the historical data. Processing then proceeds with step 365.

At step 365, the received query is executed against the identified subset of data partitions or the selected data partition(s) to obtain an initial query result. Accordingly, in the given example the exemplary SQL query of Table I is executed against the exemplary "student_grades" table of Table II to obtain the initial query result.

At step 370, a waiting state is entered until the initial query result is returned from the identified subset of data partitions. Assume now that the initial query result is defined by the exemplary result set of Table VI below.

TABLE VI

RESULT SET EXAMPLE

|  | grade |
| --- | --- |
| 001 | 5 |
| 002 | 7 |
| 003 | 8 |
| 004 | 9 |
| 005 | 12 |
| 006 | 6 |
| 007 | 10 |
| 008 | 11 |
| 009 |  |

The exemplary result set of Table VI includes eight data records in lines 002-009 that were determined from the data records in lines 002, 004-006 and 008-011 of Table II, respectively.

When the initial query result is returned, processing proceeds with step 375. At step 375, it is determined whether the returned initial query result is complete. In other words, it is determined whether the number of data records included with the returned initial query result matches (i) the user-specified number that needs to be included with the requested subset of data records, or (ii) the number of data records that the user fetched in a previous execution(s) of the received query. If so, processing proceeds with step 390 where the returned initial query result is output to the user. For instance, the returned initial result set is displayed to the user at step 390. Otherwise, processing proceeds with step 380.

As in the given example eight data records were requested according to the "FETCH FOR 8 ROWS" clause in lines 009-010 of Table I and as the exemplary result set of Table VI includes eight data records, as noted above, the determination at step 375 is affirmative. Accordingly, in the given example processing proceeds with step 390 and processing then exits.

However, assume now that the exemplary result set of Table VI was generated using the selected data partition(s) that were identified at step 350. Assume further that the selected data partition(s) were supposed to return ten data records by virtue of the user having fetched ten records in a previous execution(s) of the received query. In this case, processing proceeds from step 375 to step 380, as two data records are missing to complete the returned initial query result.

At step 380, a loop consisting of steps 380 to 388 is entered for each remaining data partition of the partitioned database that was not yet queried with respect to the received query in order to fetch the missing data records. The loop is initially entered at step 380 for a first remaining partition. For instance, assume that in the given example only the eastern states partition was queried and that the western, northern and southern states partitions were not yet queried.

At step 384, the received query is executed against the first remaining partition to obtain additional data records. Then, at step 388 it is determined whether the amount of data records included with the returned initial query result and the additional data records corresponds to the number of data records that the user fetched in a previous execution(s) of the received query. If so, the loop consisting of steps 380 to 388 is interrupted and processing proceeds with 390. Otherwise, the loop consisting of steps 380 to 388 is re-entered to retrieve additional records. Accordingly, one or more of the other remaining partitions may be accessed to retrieve the records.

It should be noted that the above merely represents an exemplary embodiment of a method for managing execution of the received query against the partitioned database. However, other implementations and/or implementation of additional features are also possible. For instance, after analysis of the query result output at step 390, the user may request an additional number of data records independent of whether a requested number of data records was already returned. For instance, the user may request an additional ten data records after receiving the initial eight data records determined using the "FETCH FOR 8 ROWS" clause according to lines 009-010 of the exemplary SQL query of Table I. In other words, the initial set of eight records is a "best guess" which may not be satisfactory to the user. Accordingly, the loop consisting of steps 380 to 388 can be performed for one or more data partitions that were not yet queried using the received query as described above until the requested additional amount of data records is retrieved and output at step 390. All such different implementations are broadly contemplated.

Identification of Selected Data Partitions from a Partitioned Database

Figure 4:
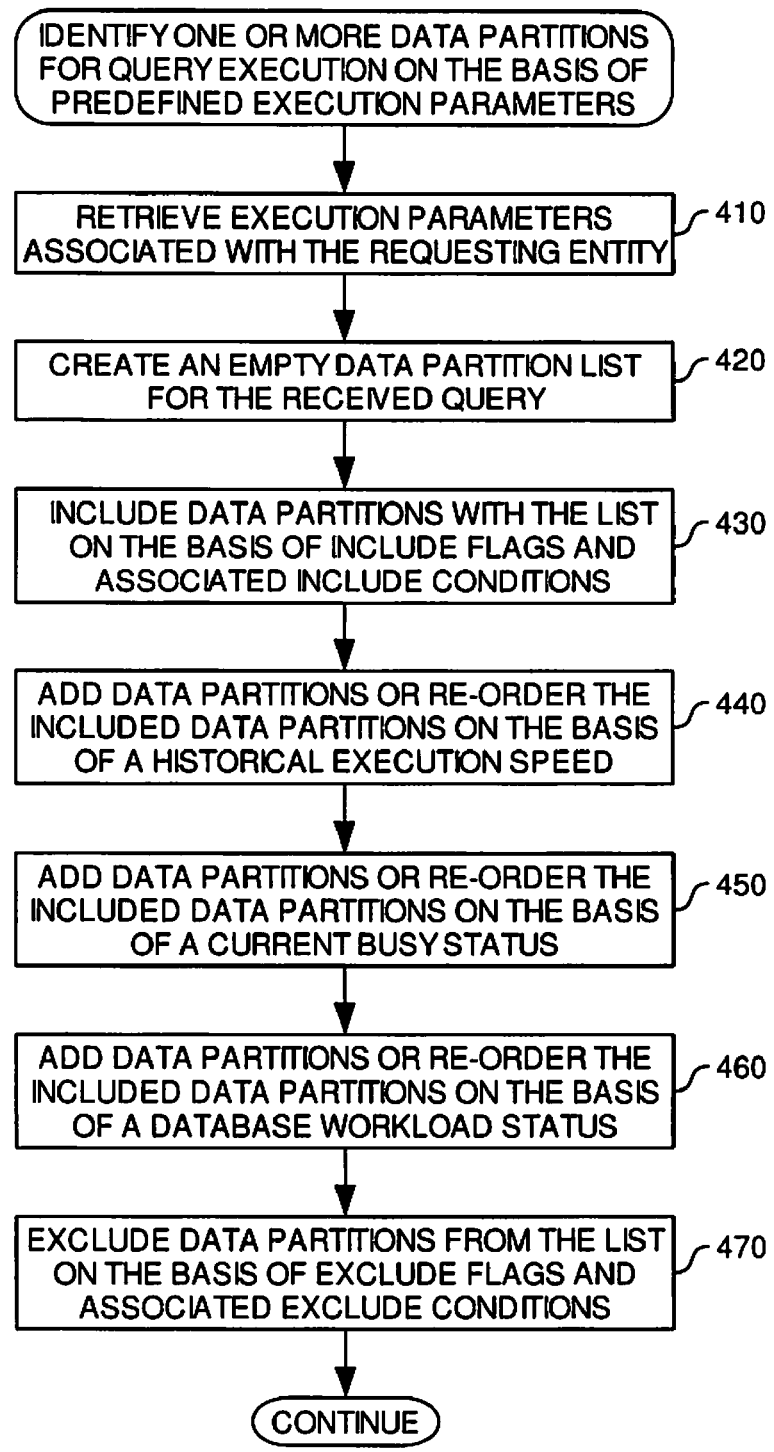
FIG. 4 is a flow chart illustrating a method of identifying selected data partitions for query execution on the basis of predefined execution parameters according to one embodiment of the invention.

Referring now to FIGS. 4 and 5, one embodiment of a method 400 for managing identification of the selected data partition(s) on the basis of the predefined execution parameters according to step 350 of the method 300 of FIG. 3 is described. At least a portion of the steps of method 400 can be performed using the query execution component 124 of FIG. 1.

Method 400 starts at step 410, where the predefined execution parameters (e.g., execution parameters 139 of FIG. 1) associated with the user are retrieved. An illustrative table 500 exemplifying the predefined execution parameters is illustrated in FIG. 5.

Referring now to FIG. 5, in one embodiment the table 500 includes at least one row for each data partition of an underlying partitioned database. Each data partition is uniquely identified by a partition identifier "PARTITION ID" in a column 502 of table 500. Illustratively, the table 500 includes four rows 512, 514, 516, 518 related to four distinct partitions "1", "2", "3" and "4", respectively (e.g., the eastern, western, northern and southern states partitions according to Tables II to V above). The table 500 further includes columns 503, 504, 505, 507 and 508 defining different execution parameters with respect to the distinct partitions. Illustratively, column 503 contains include and exclude flags, column 504 contains conditions that are associated with the corresponding flags in column 503, column 505 contains historical execution speed flags, column 507 contains current busy flags, and column 508 contains optimizer awareness flags. Use of the execution parameters defined in columns 503 to 508 is now described with reference to steps 420 to 470 of the method 400 of FIG. 4.

Referring now back to FIG. 4, at step 420 an empty data partition list is created for the selected data partition(s) for execution of the received query. The empty list is subsequently populated with the selected data partition(s) identified from the plurality of data partitions of the underlying partitioned database, as described below.

At step 430, all data partitions for which a corresponding include flag is set in the execution parameters are identified. For each identified data partition, an associated inclusive condition is determined from the execution parameters. The inclusive condition needs to be satisfied to include the identified data partition with the created data partition list. In one embodiment, an inclusive condition defines at least one of (i) a user identifier that needs to be matched, (ii) a minimum allowed central processing unit availability, (iii) a maximum allowed direct access storage device usage, and (iv) a maximum allowed memory usage. However, it should be noted that various other inclusive conditions are broadly contemplated, such as inclusive conditions related to job names, job priorities, job types, requesting times and/or dates and requesting location of the received query.

In the given example, the include flags of data partitions "1" and "3" according to rows 512 and 516 of table 500 of FIG. 5 are set ("INCLUDE") in column 503. For partition "1", an associated inclusive condition in column 504 indicates that partition "1" is to be included with the created data partition list if a corresponding identifier of the user matches "5001". For partition "3", an associated inclusive condition in column 504 indicates that direct access storage device usage of partition "3" needs to be less than 10%. Accordingly, a verification is performed at step 430 for partitions "1" and "3" to determine whether the associated inclusive conditions are satisfied and, if so, the partitions are included with the data partition list. Assume now that both inclusive conditions are satisfied and that both partitions are included with the list.

At step 440, data partitions for which a corresponding historical execution speed flag is set in the execution parameters are identified. Identified data partitions that are not already contained in the data partition list are added to the data partition list. Then, the listed data partitions having the corresponding historical execution speed flag set are re-ordered according to their respective historical execution speeds. The historical execution speed of a given data partition indicates a duration for a previous execution of the received query against the given data partition. In one embodiment, the respective historical execution speeds are retrieved from suitable historical data (e.g., historical data 129 of FIG. 1). An illustrative table exemplifying suitable historical data is illustrated in FIG. 6.

In the given example, the historical execution speed flags of data partitions "2" and "3" according to rows 514 and 516 of table 500 of FIG. 5 are set ("YES") in column 505. Partition "3" is already included with the data partition list, as noted above, but not partition "2". Accordingly, partition "2" is added to the data partition list. Then, partitions "2" and "3" in the data partition list are re-ordered according to their respective historical execution speeds. Assume now that partition "3" is historically faster than partition "2", as illustrated by way of example in FIG. 6. Accordingly, the order "1", "3", "2" is established.

At step 450, data partitions for which a corresponding current busy flag is set in the execution parameters are identified. Identified data partitions that are contained in the data partition list are added to the data partition list. Then, the listed data partitions having the current busy flag set are re-ordered according to their respective current busy status. The current busy status of a given data partition indicates a degree of current work load on the given data partition (i.e., this metric is a measure of partition availability). The current working load depends on current and/or projected machine resources being used to manage workload on the given data partition. In one embodiment, the respective current busy statuses are retrieved from corresponding system parameters provided by an underlying computer system (e.g., server 102 of FIG. 1).

In the given example, the current busy flags of data partitions "2" and "4" according to rows 514 and 518 of table 500 of FIG. 5 are set ("YES") in column 507. In the present example, partition "2" is already included with the data partition list, as noted above, but not partition "4". Accordingly, partition "4" is added to the list. Then, the data partitions "2" and "4" in the data partition list are re-ordered according to their current busy status. Assume now that the order "1", "3", "4", "2" is established accordingly.

At step 460, data partitions for which a corresponding optimizer awareness flag is set in the execution parameters are identified. Identified data partitions that are not already contained in the data partition list are included therewith. Then, the listed data partitions having the optimizer awareness flag set are re-ordered according to a determined database workload status. The database workload status of a given data partition indicates a degree of current and/or projected query workload applied to the given data partition as determined by a database optimizer (which may be part of the query execution component 124 of FIG. 1).

In the given example, the optimizer awareness flags of data partitions "2" to "4" according to rows 514, 516 and 518 of table 500 of FIG. 5 are set ("YES") in column 508. In the present example all partitions are already included with the data partition list, as noted above. Accordingly, the data partitions "2", "3" and "4" in the data partition list are re-ordered according to their database workload status. Assume now that the order "1", "2", "4", "3" is established accordingly.

At step 470, all data partitions for which a corresponding exclude flag is set in the execution parameters are identified. For each identified data partition, an associated exclusive condition is determined from the execution parameters. If the exclusive condition is satisfied the associated data partition is removed from the created data partition list. In one embodiment, an exclusive condition defines at least one of (i) a maximum allowed central processing unit availability, (ii) a minimum allowed direct access storage device usage, and (iii) a minimum allowed memory usage. However, it should be noted that various other exclusive conditions are broadly contemplated, such as exclusive conditions related to job names, job priorities, job types, requesting times and/or dates and requesting location of the received query. Processing then continues at step 365 of the method 300 of FIG. 3A.

It should be noted that a given data partition can be included with the data partition list at step 430 on the basis of an include flag associated with a satisfied inclusive condition. The given data partition can then be removed from the list at step 470 on the basis of an exclude flag associated with a satisfied exclusive condition.

In the given example, the exclude flags of data partitions "2" and "4" according to rows 514 and 518 of table 500 of FIG. 5 are set ("EXCLUDE") in column 508. For partition "2", an associated exclusive condition in column 504 indicates that partition "2" is to be excluded from the created data partition list if central processor unit availability is less than 25%. For partition "4", an associated inclusive condition in column 504 indicates that memory usage of partition "4" needs to be greater than 5% to exclude partition "4" from the data partition list. Accordingly, a verification is performed at step 470 for partitions "2" and "4" to determine whether the associated exclusive conditions are satisfied and, if so, the partitions are removed from the data partition list. Assume now that only the exclusive condition of partition "2" is satisfied. Thus, partition "2" is removed from the list, so that the resulting list is "1", "4", "3".

While the foregoing is directed to embodiments of the present invention, other and further embodiments of the invention may be devised without departing from the basic scope thereof, and the scope thereof is determined by the claims that follow.

What is claimed is:

1. A computer-implemented method of managing execution of a query against a partitioned database having a plurality of data partitions, each data partition containing different data relative to the other data partitions, each data partition having a different workload, the method comprising:
   receiving a query having conditional filtering logic to restrict data records in the partitioned database to a result set satisfying the conditional filtering logic;
   based on an indication that only a subset of the result set is to be returned, determining a subset of data partitions from the plurality of data partitions from which the subset of the result set is retrievable, wherein the subset is determined with reference to a numerical limit on results to be returned and without regard for any particular fields in the result set, wherein the indication is historical data indicative of an amount of data records returned from specified ones of the plurality of data partitions for previous executions of the query, and wherein determining the subset of data partitions from which to retrieve the subset of the result set comprises:
      identifying the specified ones of the plurality of data partitions in the historical data as the subset of data partitions;
   executing the query only against the subset of data partitions; and
   returning the subset of the result set.

2. The method of claim 1, wherein the partitioned database is partitioned according to a particular subject matter relationship of data, and the received query is a structured query language (SQL) query having an ORDER BY clause requesting that the subset of the result set be ordered on the basis of the subject matter relationship of the data.

3. The method of claim 2, wherein the historical data includes information about a number of data records satisfying the ORDER BY clause that are retrievable from the subset of data partitions, the number being equal or greater than a predefined amount of data records defining the subset of the result set.

4. A computer-implemented method of managing execution of a query against a partitioned database having a plurality of data partitions, each data partition containing different data relative to the other data partitions, each data partition having a different workload, the method comprising:

receiving a query having conditional filtering logic to restrict data records in the partitioned database to a result set satisfying the conditional filtering logic;

based on an indication that only a subset of the result set is to be returned, determining a subset of data partitions from the plurality of data partitions from which the subset of the result set is retrievable, wherein the subset is determined with reference to a numerical limit on results to be returned and without regard for any particular fields in the result set, wherein the indication is historical data indicative of an amount of data records returned from specified ones of the plurality of data partitions for previous executions of the query, and wherein determining the subset of data partitions from which to retrieve the subset of the result set comprises:

accessing user-specific query execution parameters indicating for at least one of the plurality of data partitions at least one of (i) an associated inclusive condition that needs to be satisfied to include the partition with the subset of data partitions, and (ii) an associated exclusive condition that needs to be satisfied to exclude the partition from the subset of data partitions;

including the at least one data partition with the subset of data partitions based on whether the associated inclusive condition is satisfied; and excluding the at least one data partition from the subset of data partitions based on whether the associated exclusive condition is satisfied, even whether the associated inclusive condition is satisfied;

executing the query only against the subset of data partitions; and returning the subset of the result set.

5. The method of claim 4, wherein the associated inclusive condition defines at least one of:
(i) a user identifier that needs to be matched;
(ii) a minimum allowed central processing unit availability;
(iii) a maximum allowed direct access storage device usage; and
(iv) a maximum allowed memory usage.

6. The method of claim 4, wherein the associated exclusive condition defines at least one of:
(i) a maximum allowed central processing unit availability;
(ii) a minimum allowed direct access storage device usage; and
(iii) a minimum allowed memory usage.

7. The method of claim 1, further comprising:
accessing the historical data further indicating query execution durations for previous executions of the received query against at least some of the data partitions included with the subset of data partitions; and
defining a sequence of execution for execution of the received query against the subset of data partitions on the basis of the query execution durations.

8. The method of claim 4, further comprising:
determining, from the user-specific query execution parameters, whether a sequence of execution for execution of the received query against the subset of data partitions is to be defined on the basis of a current partition availability; and
upon determining that the sequence of execution for execution of the received query against the subset of data partitions is to be defined on the basis of a current partition availability, defining the sequence of execution such that the received query is initially executed against partitions included with the subset of data partitions that are currently available.

9. The method of claim 4, further comprising:
determining, from the user-specific query execution parameters, whether a sequence of execution for execution of the received query against the subset of data partitions is to be defined on the basis of a database workload;
upon determining that the sequence of execution for execution of the received query against the subset of data partitions is to be defined on the basis of a database workload, identifying one or more data partitions from the subset of data partitions having a workload that is below a predefined threshold value; and
defining the sequence of execution such that the received query is initially executed against the identified partitions.

10. A computer-readable storage medium containing a program which, when executed by a processor, performs a process for managing execution of a query against a partitioned database having a plurality of data partitions, each data partition containing different data relative to the other data partitions, each data partition having a different workload, the process comprising:

receiving a query having conditional filtering logic to restrict data records in the partitioned database to a result set satisfying the conditional filtering logic;

based on an indication that only a subset of the result set is to be returned, determining a subset of data partitions from the plurality of data partitions from which the subset of the result set is retrievable, wherein the subset is determined with reference to a numerical limit on results to be returned and without regard for any particular fields in the result set, wherein the indication is historical data indicative of an amount of data records returned from specified ones of the plurality of data partitions for previous executions of the query, and wherein determining the subset of data partitions from which to retrieve the subset of the result set comprises:
identifying the specified ones of the plurality of data partitions in the historical data as the subset of data partitions;

executing the query only against the subset of data partitions; and returning the subset of the result set.

11. The computer-readable storage medium of claim 10, wherein the partitioned database is partitioned according to a particular subject matter relationship of data, and the received query is a structured query language (SQL) query having an ORDER BY clause requesting that the subset of the result set be ordered on the basis of the subject matter relationship of the data.

12. The computer-readable storage medium of claim 11, wherein the historical data includes information about a number of data records satisfying the ORDER BY clause that are retrievable retrieved from the subset of data partitions, the number being equal or greater than a predefined amount of data records defining the subset of the result set.

13. A computer-readable storage medium containing a program which, when executed by a processor, performs a process for managing execution of a query against a partitioned database having a plurality of data partitions, each data partition containing different data relative to the other data partitions, each data partition having a different workload, the process comprising:

receiving a query having conditional filtering logic to restrict data records in the partitioned database to a result set satisfying the conditional filtering logic;

based on an indication that only a subset of the result set is to be returned, determining a subset of data partitions from the plurality of data partitions from which the subset of the result set is retrievable, wherein the subset is determined with reference to a numerical limit on results to be returned and without regard for any particular fields in the result set, wherein the indication is historical data indicative of an amount of data records returned from specified ones of the plurality of data partitions for previous executions of the query, and wherein determining the subset of data partitions from which to retrieve the subset of the result set comprises:

accessing user-specific query execution parameters indicating for at least one of the plurality of data partitions at least one of (i) an associated inclusive condition that needs to be satisfied to include the partition with the subset of data partitions, and (ii) an associated exclusive condition that needs to be satisfied to exclude the partition from the subset of data partitions;

including the at least one data partition with the subset of data partitions based on whether the associated inclusive condition is satisfied; and excluding the at least one data partition from the subset of data partitions based on whether the associated exclusive condition is satisfied, even whether the associated inclusive condition is satisfied;

executing the query only against the subset of data partitions; and returning the subset of the result set.

14. The computer-readable storage medium of claim 13, wherein the associated inclusive condition defines at least one of:
(i) a user identifier that needs to be matched;
(ii) a minimum allowed central processing unit availability;
(iii) a maximum allowed direct access storage device usage; and
(iv) a maximum allowed memory usage.

15. The computer-readable storage medium of claim 13, wherein the associated exclusive condition defines at least one of:
(i) a maximum allowed central processing unit availability;
(ii) a minimum allowed direct access storage device usage; and
(iii) a minimum allowed memory usage.

16. The computer-readable storage medium of claim 10, wherein the process further comprises:
accessing the historical data further indicating query execution durations for previous executions of the received query against at least some of the data partitions included with the subset of data partitions; and
defining a sequence of execution for execution of the received query against the subset of data partitions on the basis of the query execution durations.

17. The computer-readable storage medium of claim 13, wherein the process further comprises:
determining, from the user-specific query execution parameters, whether a sequence of execution for execution of the received query against the subset of data partitions is to be defined on the basis of a current partition availability; and
upon determining that the sequence of execution for execution of the received query against the subset of data partitions is to be defined on the basis of a current partition availability, defining the sequence of execution such that the received query is initially executed against partitions included with the subset of data partitions that are currently available.

18. The computer-readable storage medium of claim 13, wherein the process further comprises:
determining, from the user-specific query execution parameters, whether a sequence of execution for execution of the received query against the subset of data partitions is to be defined on the basis of a database workload; and
upon determining that the sequence of execution for execution of the received query against the subset of data partitions is to be defined on the basis of a database workload, identifying one or more data partitions from the subset of data partitions having a workload that is below a predefined threshold value; and
defining the sequence of execution such that the received query is initially executed against the identified partitions.

* * * * *